United States Patent
Isgar

(10) Patent No.: US 11,651,648 B2
(45) Date of Patent: May 16, 2023

(54) RETRO SPORTS SYSTEM

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 99 days.

(21) Appl. No.: 17/202,561

(22) Filed: Mar. 16, 2021

(65) Prior Publication Data
US 2021/0319654 A1    Oct. 14, 2021

Related U.S. Application Data

(63) Continuation-in-part of application No. 17/195,947, filed on Mar. 9, 2021.

(60) Provisional application No. 63/009,373, filed on Apr. 13, 2020.

(51) Int. Cl.
*G07F 17/32* (2006.01)

(52) U.S. Cl.
CPC ........ *G07F 17/3223* (2013.01); *G07F 17/323* (2013.01); *G07F 17/3209* (2013.01); *G07F 17/3211* (2013.01); *G07F 17/3288* (2013.01)

(58) Field of Classification Search
USPC ......................................................... 463/42
See application file for complete search history.

(56) References Cited

U.S. PATENT DOCUMENTS

| | | | |
|---|---|---|---|
| 10,643,432 B1 | 5/2020 | Abrahamson et al. | |
| 10,918,959 B2 | 2/2021 | Wagschal | |
| 2004/0078208 A1* | 4/2004 | Burwell | G09B 9/04 703/6 |
| 2006/0129458 A1 | 6/2006 | Maggio | |
| 2011/0028195 A1 | 2/2011 | Pennington et al. | |
| 2012/0231890 A1 | 9/2012 | Junkin et al. | |
| 2014/0344294 A1* | 11/2014 | Skeen | H04L 65/612 707/754 |
| 2015/0375117 A1 | 12/2015 | Thompson | |
| 2016/0008723 A1 | 1/2016 | Thompson | |
| 2017/0021280 A1 | 1/2017 | Sugavanam et al. | |
| 2018/0071638 A1 | 3/2018 | Wagschal | |
| 2018/0114409 A1* | 4/2018 | Amaitis | G07F 17/3288 |
| 2018/0126285 A1* | 5/2018 | Kehoe | A63F 13/825 |
| 2018/0353861 A1 | 12/2018 | Amaitis et al. | |
| 2020/0188799 A1* | 6/2020 | Croci | A63F 13/65 |
| 2020/0334954 A1 | 10/2020 | Nelson et al. | |

OTHER PUBLICATIONS

Isgar, Charles, Retro Sports System, Patent Cooperation Treaty Application Serial No. PCT/US21/26964, filed Apr. 13, 2021, International Search Report and Written Opinion dated Jul. 16, 2021.

Isgar, Charles, Retro Sports System, Patent Cooperation Treaty Application Serial No. PCT/US21/27077, filed Apr. 13, 2021, International Search Report and Written Opinion dated Jul. 7, 2021.

* cited by examiner

*Primary Examiner* — Michael A Cuff
(74) *Attorney, Agent, or Firm* — Schmeiser, Olsen & Watts LLP

(57) ABSTRACT

Described is a retro sports system for creating new sporting events with new outcomes utilizing past sporting events that can be used for sports gaming and entertainment or other sports competition games. The system includes a server that may be programmed to randomly select increments of historical past games in order to create a new full game formed from the randomly selected increments. This new game can be used for betting or other competitive games and for entertainment.

14 Claims, 27 Drawing Sheets

RETRO SPORTS SYSTEM

CROSS REFERENCE TO RELATED APPLICATION[S]

This application is a continuation-in-part of the earlier U.S. Utility patent application entitled "RETRO SPORTS SYSTEM," Ser. No. 17/195,947, filed Mar. 9, 2021, which claims priority to U.S. Provisional patent application entitled "Retro Sports System," Ser. No. 63/009,373, filed Apr. 13, 2020, the disclosures of which are hereby incorporated entirely herein by reference.

BACKGROUND OF THE INVENTION

Technical Field

This invention generally relates to a system for sports gaming and entertainment, and more specifically to a retro sports system for creating new sporting events with new outcomes utilizing past sporting events that can be used for sports gaming and entertainment or other sports competition games.

State of the Art

Many enjoy watching sporting events and the various uncertain outcomes that they bring. Further, many of those who enjoy sporting events also enjoy gaming and betting on the games. This is always done on games that will be held in the future, because the outcome cannot be known in order to bet or engage in any games that require some amount of chance or unknown outcome. Because of such, the ability to bet or participate in gaming activities with regard to past sporting events has not been available. There is not a system contemplated for such gaming related to past sporting events.

Accordingly, what is needed is a retro sports system for creating new sporting events with new outcomes utilizing past sporting events that can be used for sports gaming and/or other sports games. This system would be most useful when a user's favorite sport is not in season or during a time of a shutdown of sports activities or other interruptions.

SUMMARY OF THE INVENTION

An embodiment includes a retro sports system comprising: a server having a memory storing historical sports games information, including video of historical games partitioned into system-selected increments; a randomizer coupled to the server; and a user computing device coupled to the server, wherein the server is programmed to: receive and process a signal that the user computing device has accessed the system and is searching for a sports game contest from a business; send, for display on the user computing device, historical sports games information, including available historical sports games for a predetermined historical time frame; receive a historical sports game request from the user computing device and communicate with the randomizer to randomly select multiple increments of historical games from the historical sports games information that match the historical sports game request, including the teams playing within the predetermined historical time frame, and create a new sports game from the selected increments of historical sports games information stored on the server; create and deliver for display on the user computing device contest input items for selection on the user computing device; receive and process a signal from the user computing device including selection of contest input items; stream the new sports game to the user computing device; and determine whether the selected contest input items are correct.

Another embodiment includes a retro sports system comprising: a server having a memory storing historical sports games information, including video of historical games partitioned into system-selected increments; a randomizer coupled to the server; a manager computing device located at a business, the manager computing device coupled to the server; and a one or more user computing devices coupled to the server, wherein the server is programmed to: received and process a signal that the manager computing device has accessed the system; send, for display on the plurality of user computing devices, historical sports games information, including available historical sports games for a predetermined historical time frame; receive a historical sports game request from the manager computing device and communicate with the randomizer to randomly select multiple increments of historical games from the historical sports games information that match the historical sports game request, including the teams playing within the predetermined historical time frame, and create a new sports game from the selected increments of historical sports games from the historical sports games information stored on the server; receive and process a signal that the plurality of user computing devices have accessed the system and are searching for a sports game; send, for display on the plurality of user computing devices, the new sports game and contest input items for selection on the user computing devices; receive and process a signal from the plurality of user computing devices including selection of contest input items; stream the new sports game to the plurality of user computing devices; and determine whether the selected contest input items from each of the plurality of user computing devices are correct.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Embodiments of the present invention relate to a retro sports system for creating new sporting events with new outcomes utilizing increments of past sporting events that can be used for sports gaming and/or other sports games. Modern technology utilized by the system operates as a retro sports system. The system may include the use of a mobile application operating on a user computing device that may be a mobile computing device like a smartphone, a tablet, a wearable, and the like; and/or the system may operate on any type of computing device, including a TV as a downloadable application or even as a web application.

Figure 1:
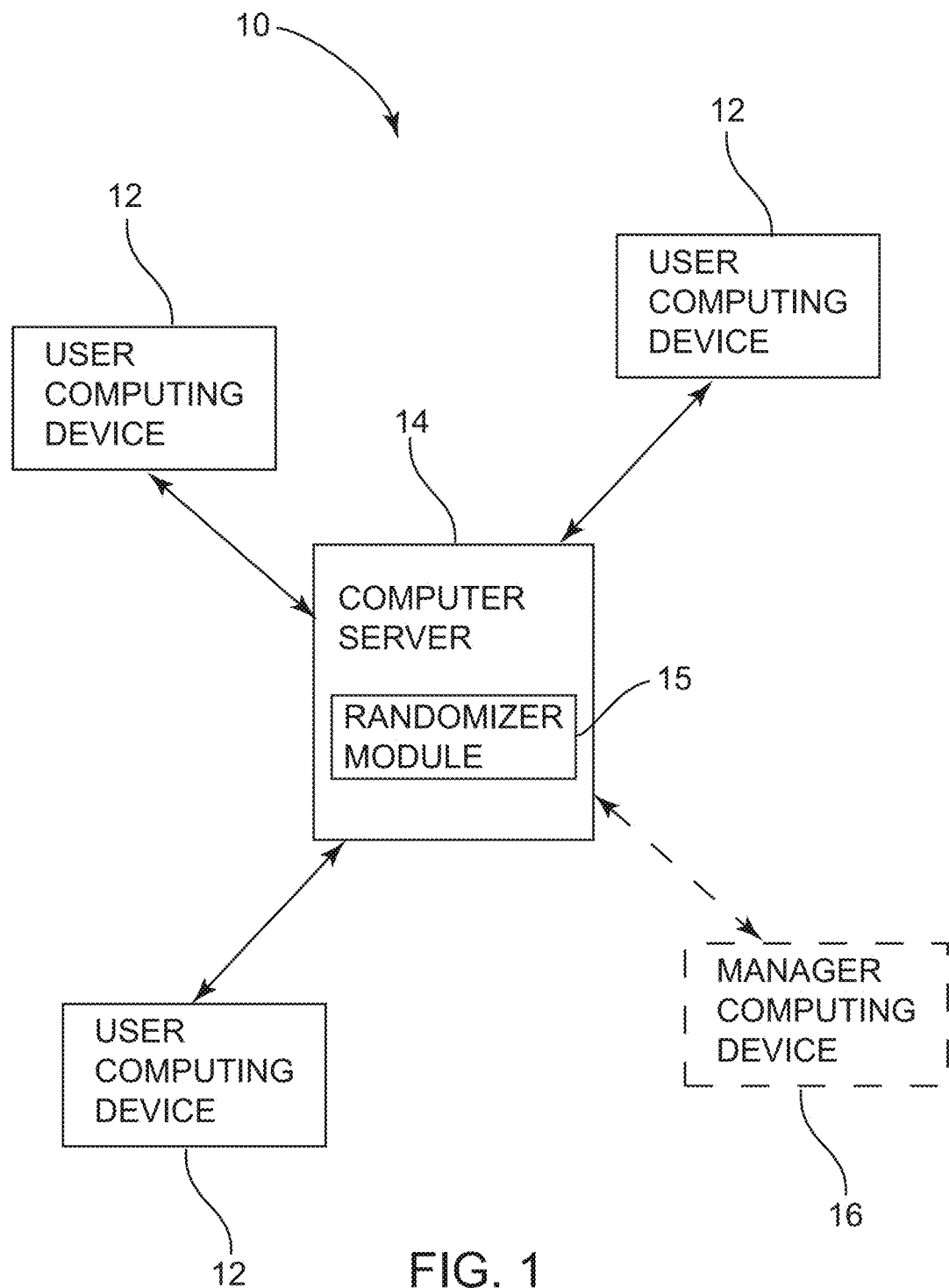
FIG. 1 is a diagrammatic view of a retro sports system according to an embodiment.

FIG. 1 depicts an embodiment of a retro sports system 10. The system 10 may include user computing devices 12 and a computer server 14, wherein each user computing device 12 is coupled to the computer server 14. This coupling may be a network connection, such as a wireless connection through an Internet connection, a Wi-Fi connection, a Bluetooth connection, or the like, wherein the user computing devices 12 may communicate with and receive communication from the server 14. The user computing device 12 may be any of a desktop computer, a laptop, a tablet, a smartphone, a wearable device, and the like. The server 14, in some embodiments, may be a computer server or a cloud-based infrastructure architecture.

The server 14 may include a memory storing historical sports games information. The historical sports games information may include sports games information for historical sports games for various sporting events, such as, but not limited to, basketball, football, baseball, hockey, soccer, and the like, on the professional level, collegiate level and so forth. Additionally, the server 14 may include or may be coupled to a randomizer module 15.

A user computing device 12 and the randomizer 15 may be coupled to the server 14, and the server 14 may be programmed to receive and process a signal that the user computing device has accessed the system and is searching for a sports game; send, for display on the user computing device, historical sports games information, including available historical sports games for a predetermined historical time frame; receive a historical sports game request from the user computing device and communicate with the randomizer 15 to randomly select multiple increments of historical games from the historical sports games information that match the historical sports game request, including the teams playing within the predetermined historical time frame, and create a new sports game from the selected increments of historical sports games from the historical sports games information stored on the server; create and deliver for display on the user computing device contest input items for selection on the user computing device; receive and process a signal from the user computing device including selection of contest input items; stream the new sports game to the user computing device or to another device designated by the user computing device; and determine whether the selected contest input items are correct. In some embodiments, the user computing device may be a plurality of user computing devices.

Referring to FIGS. 2-11B, the system 10 may then allow a user to access the system through the user computing device 12. An app operating on a user computing device, such as, but not limited to, a mobile app operating on a smart phone, may connect a user computing device with the server. The operation of the user computing device and the server may include a user interface and server operating together with the server being programmed to perform the function and send for display on the user computing device the interfaces depicted in FIGS. 2-11B.

Figure 2:
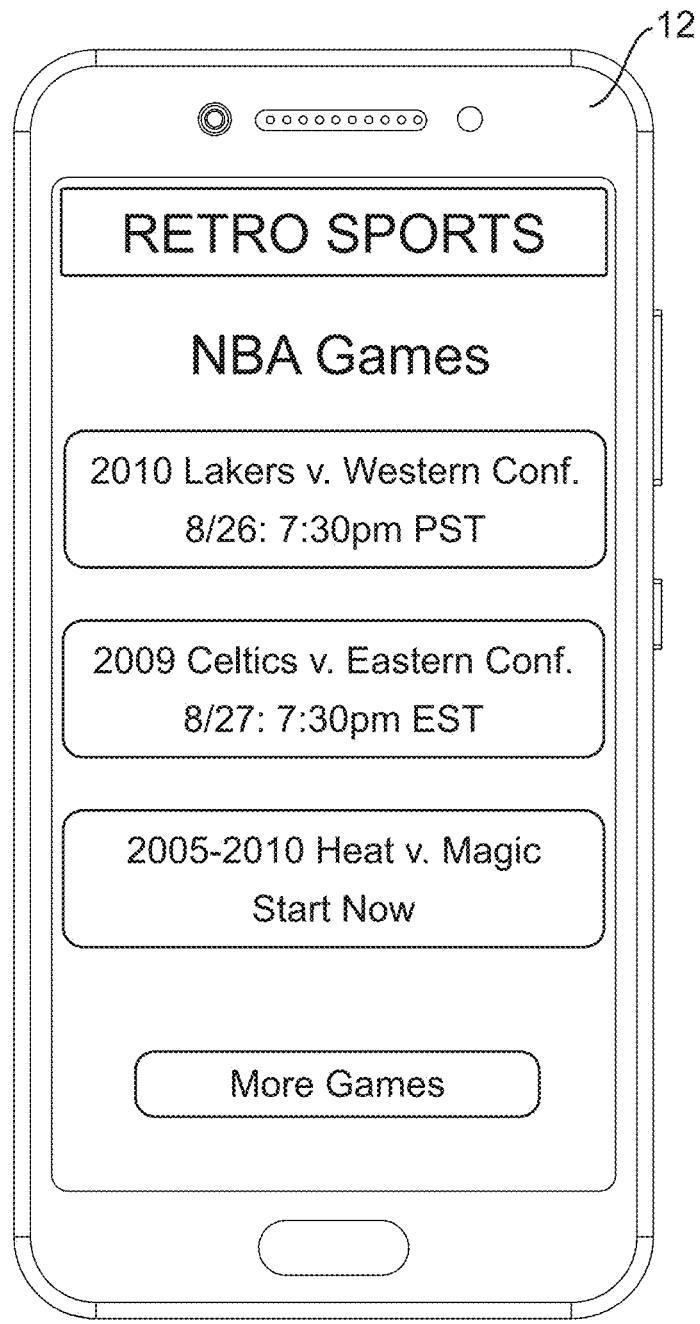
FIG. 2 is a user interface for interaction with a retro sports system according to an embodiment.

For example, FIG. 2 depicts a user computing device with an interface showing available games from the system 10. For example, as depicted in FIG. 2, the system may display basketball games, such as professional basketball games from the National Basketball Association (NBA). These games are all past or historical games, such as, but not limited to, the 2010 Lakers v. Western Conference opponents; the 2009 Celtics v. Eastern Conference opponents; the 2005-2010 Heat v. Magic rivalry opponents; and more games may be selected. The selection of one of the games results in the system operating as described above to create a new game from random increments of the historical games during the defined time period and the opponents. FIGS. 2-5G depict the use of the system for one of these games and will be utilized as an example, and not a limitation on the operation of the system.

In operation, the system 10 may be utilized for entertainment, gaming or other sports games that may be used. FIGS.

2-5G depict the use of the system 10 for gaming and entertainment and will be used as an example. A user can select the historical games of the 2010 Lakers v. Western Conference opponents. After selecting the games, the server 14 may send for display on the user computing device 12 a betting line interface as depicted in FIG. 3.

Figure 3:
FIG. 3 is a user interface for interaction with a retro sports system according to an embodiment.
Figure 4:
FIG. 4 is a user interface for interaction with a retro sports system according to an embodiment.

FIG. 3 depicts the betting lines available for the game and the odds. For general understanding provided by this disclosure, it is important to understand certain information involved in gaming. Odds making is an important aspect of gaming that has not changed over the years, wherein the ultimate goal set by the sportsbooks is to balance the action on both sides of a wager/game. In prior days, the odds were set by humans, and as time has progressed, the setting of odds has evolved into the use of computing power along with human input. Understanding bettor behavior, mathematically managing risk, and determining the public's reaction to specific lines, all play equally large parts in the creation of odds. Computers have the ability to process more data than humans, and oddsmakers use this to their advantage to synthesize the insight of mathematicians and statisticians, making the process more quantifiable and much more precise. Odds making is predicted to eventually be automated with artificial intelligence learning algorithms reducing the human element. This gives way to further development of embodiments of this retro gaming system.

Further, with regard to FIG. 3, it is important to understand generalities about betting terms. The following are examples and are not intended to be a full explanation or recitation of all betting lines. The following are provided for explanatory examples:
- a. Sports Book: Often referred to as the "book", it is typically an organization/casino that accepts and pays out in sports wagers.
- b. Linesmaker/Oddsmaker: The person or group of people in the Sports Book that set the lines (spread, total, moneyline, futures) for a specific game or sport. The goal for a linesmaker/oddsmaker is to set a game line where they receive approximately even money on both sides so that they guarantee themselves a win on that game due to the vig(orish).
- c. Spread: Also known as the "line" or "point spread," the spread describes the number of points that the "better" team is favored to win by, or the number of points added to the score of the "worse" team for purposes of the bet. The spread may be presented in several ways: "the Patriots are favored by 14 over the lowly Browns"; "Patriots −14" or "Browns +14." In any case, the spread is 14. The Patriots are a 14 point favorite, and the Browns are a 14 point "underdog" or "dog." For purposes of the wager, 14 points are subtracted from the Patriots score or 14 points are added to the Browns score.
- d. Opening Line: The initial price set on a game. For example, the Cowboys opened up as 4½ point favorites over the Eagles on Sunday night in Week 2 following the week one games. The line may then move up or down based on the action from the betting public.
- e. Favorite: This refers to the team that is expected/ projected to win the game outright. For example, the Patriots were a three-point favorite (−3) in Super Bowl 51. That means if you are wagering on the Patriots to cover, you start out the game losing 3-0. Wagering on the favorite is often referred to as "taking chalk".
- f. Underdog: Often referred to as the dog, this is the team expected/projected to lose the game outright. The Falcons were the dog in Super Bowl 51 (+3). If you wagered on the Falcons in Super Bowl 51, you started out the game leading 3-0.
- g. Taking or laying the points: This refers to a bettor's position on the spread. If an underdog is getting 3.5 points, you are "taking the points" if you bet that side. If you are "laying" 3.5 points on the favorite (think of it as giving away), you believe (or you are hoping) that your team will win by 4 points or more.
- h. Moneyline or Straight Up: When you bet the moneyline, you do not have to worry about the spread. You bet on a team to win, and you hit or miss according to the game's winner and loser. The moneyline is a function based on the number 100. If a team is a big spread favorite, let us say a touchdown, the moneyline might be −300 (minus 300), meaning you would need to wager $300 to win $100. Meanwhile, that team's opponent might be +270, meaning if you bet $100 and the underdog won, you would get $270. In a game that is evenly matched (a spread of "even" or "pick'em"), the moneyline on both sides will typically be −110. This means that you need to bet $110 to win $100, or if you bet $100 exactly you stand to win about $91. A game with a "pick'em" spread would not result in a +100 money line for both teams because the casino must make its "profit" somewhere. See "vig" for more details.
- i. Cover: When a "favorite" covers the spread, they have won by more points than they were favored by. Using the Patriots-Browns example above, if the Patriots win by 17, they have covered the 14 point spread. If they win by only 10, they have not covered the spread. When an "underdog" covers the spread, they've lost by fewer points than they were "given," or won the game outright. If the Browns lose to the Patriots by 7, they have covered the spread because they lost by fewer than 14.

FIG. 3 depicts the current betting lines in accordance with the present invention. When a user selects the "bet" button, the user may then be directed to a wager interface depicted in FIG. 4, wherein the user may then enter wager amounts and the lines that the user wishes to bet on. The user may then submit his or her bet. It should be appreciated that while the betting lines are depicted for the game as a whole, the system may be operational to bet on individual quarters in addition to the entire game.

Prior to streaming, the server may determine the game by the randomizer 15 randomly selecting the increments of historical games from the historical sports games information that match the historical sports game request, including the teams playing within the predetermined historical time frame, and create a new sports game from the selected increments of historical sports games from the historical sports games information stored on the server. In the basketball game being delivered in FIGS. 2-5G, the increments of the games are quarters of random games of the Lakers v. Western Conference opponents in the tie period of the 2010 season, which is games played during the season that begins in 2009 and ends in 2010. For example, and as depicted in FIGS. 5A, 5C, 5E and 5G, the new sports game includes, during the 2010 season, the Lakers playing the Clippers in the first quarter by randomly selecting a first quarter of one of the games between the Lakers and Clippers; the Suns in the second quarter by randomly selecting a second quarter of one of the games between the Lakers and Suns; the Spurs in the third quarter by randomly selecting a third quarter of one of the games between the Lakers and Spurs; and the Jazz in the fourth quarter by randomly selecting a fourth quarter of one of the games between the Lakers and Jazz, thereby forming the new sports game with a new, unknown outcome.

Figure 18:
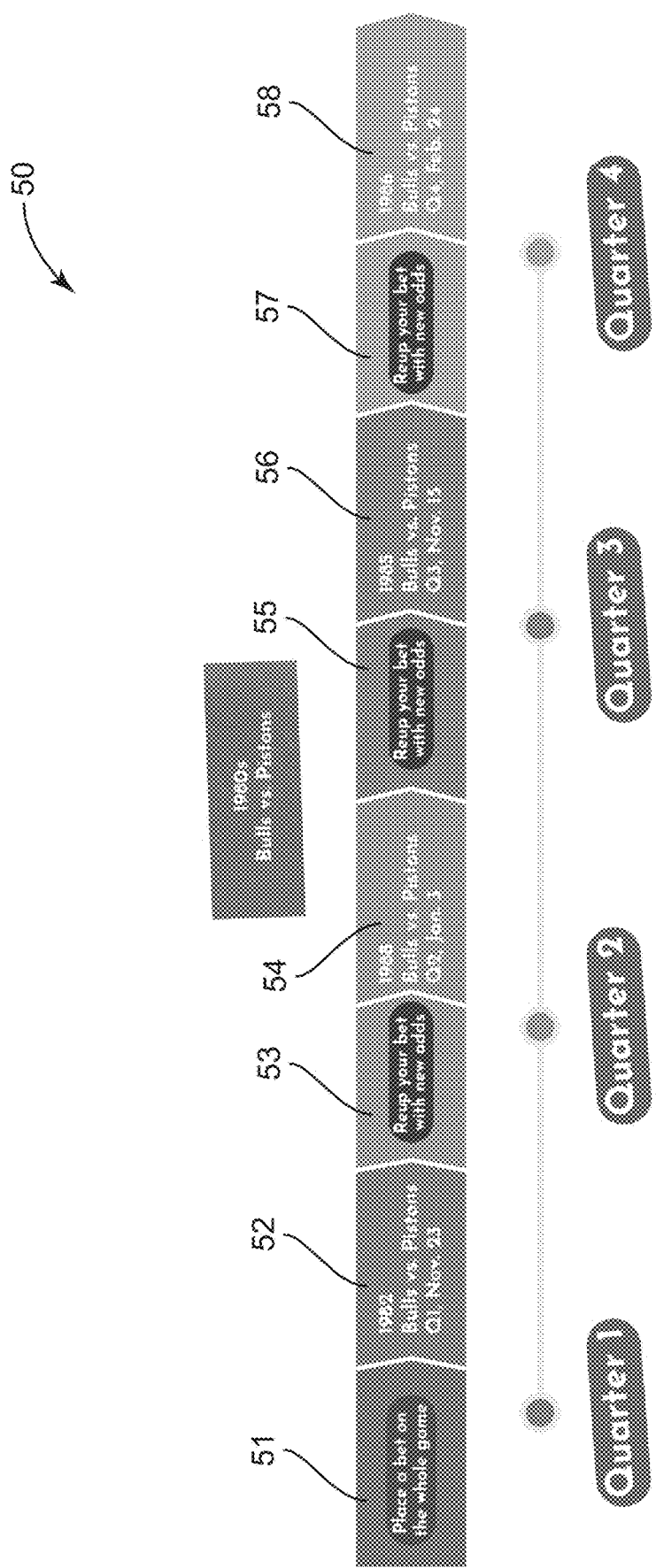
FIG. 18 depicts a flow chart of a method of operating a retro sports system according to an embodiment.

Referring additionally to FIG. 18, the overall operation of the system for betting type games may include the operation as shown in FIG. 18. For example, in a basketball game scenario, a method 50 of using the retro sports system may include the server 14 sending instruction to the user computing device 12 to place a bet (Step 51) prior to streaming the game. Once bets are placed, the server 14 may send the video for the first increment of time ($1^{st}$ quarter) for playing/streaming on the user computing device 12 (Step 52). After streaming the first increment of time of the historical game, the server 14 may send for display on the user computing device a user interface to place an additional bet(s) (Step 53). Once bets are placed, the server 14 may send the video for the second increment of time ($2^{nd}$ quarter) for playing/streaming on the user computing device 12 (Step 54). After streaming the second increment of time of the historical game, the server 14 may send for display on the user computing device a user interface to place an additional bet(s) (Step 55). Once bets are placed, the server 14 may send the video for the third increment of time (3rd quarter) for playing/streaming on the user computing device 12 (Step 56). After streaming the third increment of time of the historical game, the server 14 may send for display on the user computing device a user interface to place an additional bet(s) (Step 57). Once bets are placed, the server 14 may send the video for the fourth increment of time (4th quarter) for playing/streaming on the user computing device 12 (Step 58). While this operation is shown for betting, it may be adapted for contests, casual games, fantasy games and the like, such as entering new guesses/input on the games as part of a contest between increments of time, and so forth.

Figure 5A:
FIG. 5A is a user interface for interaction with a retro sports system according to an embodiment.

A more detailed example of method 50 can be found in FIGS. 5A-5G. The user may then be directed to a streaming interface as shown in FIG. 5A. The streaming interface may include steaming the first quarter between the Lakers and Clippers tracking the score as points are scored in the game. There is also a chat function allowing those that have bet, or friends, or the like, using the system 10 and viewing the retro game between Lakers and Western Conference opponents, to chat and engage with each other.

Figure 5B:
FIG. 5B is a user interface for interaction with a retro sports system according to an embodiment.

Once the first quarter is complete, the user may be directed to a betting interface as shown in FIG. 5B. This allows the user to bet further on the game with changed odds since there are only 3 quarters left. It should be appreciated that, while the betting lines are depicted for the game as a whole, the system may be operational to bet on individual quarters in addition to the entire game.

Figure 5C:
FIG. 5C is a user interface for interaction with a retro sports system according to an embodiment.

The user may then be directed to a streaming interface as shown in FIG. 5C. The streaming interface may include steaming the second quarter between the Lakers and Suns tracking the score as points are scored in the game, wherein the points scored by the teams now playing in the second quarter are added to the first quarter points to provide the current score between the teams. There is also a chat function allowing those that have bet, or friends, or the like, using the system 10 and viewing the retro game between Lakers and Western Conference opponents, to chat and engage with each other.

Figure 5D:
FIG. 5D is a user interface for interaction with a retro sports system according to an embodiment.

Once the second quarter is complete, the user may be directed to a betting interface as shown in FIG. 5D. This allows the user to bet further on the game with changed odds since there are only 2 quarters left. It should be appreciated that, while the betting lines are depicted for the game as a whole, the system may be operational to bet on individual quarters in addition to the entire game.

Figure 5E:
FIG. 5E is a user interface for interaction with a retro sports system according to an embodiment.

The user may then be directed to a streaming interface as shown in FIG. 5E. The streaming interface may include steaming the third quarter between the Lakers and Spurs, tracking the score as points are scored in the game, wherein the points scored by the teams now playing in the third quarter are added to the combined first and second quarter points to provide the current score between the teams. There is also a chat function allowing those that have bet, or friends, or the like, using the system 10 and viewing the retro game between Lakers and Western Conference opponents, to chat and engage with each other.

Figure 5F:
FIG. 5F is a user interface for interaction with a retro sports system according to an embodiment.

Once the first quarter is complete, the user may be directed to a betting interface as shown in FIG. 5F. This allows the user to bet further on the game with changed odds since there is only 1 quarter left. It should be appreciated that, while the betting lines are depicted for the game as a whole, the system may be operational to bet on individual quarters in addition to the entire game.

Figure 5G:
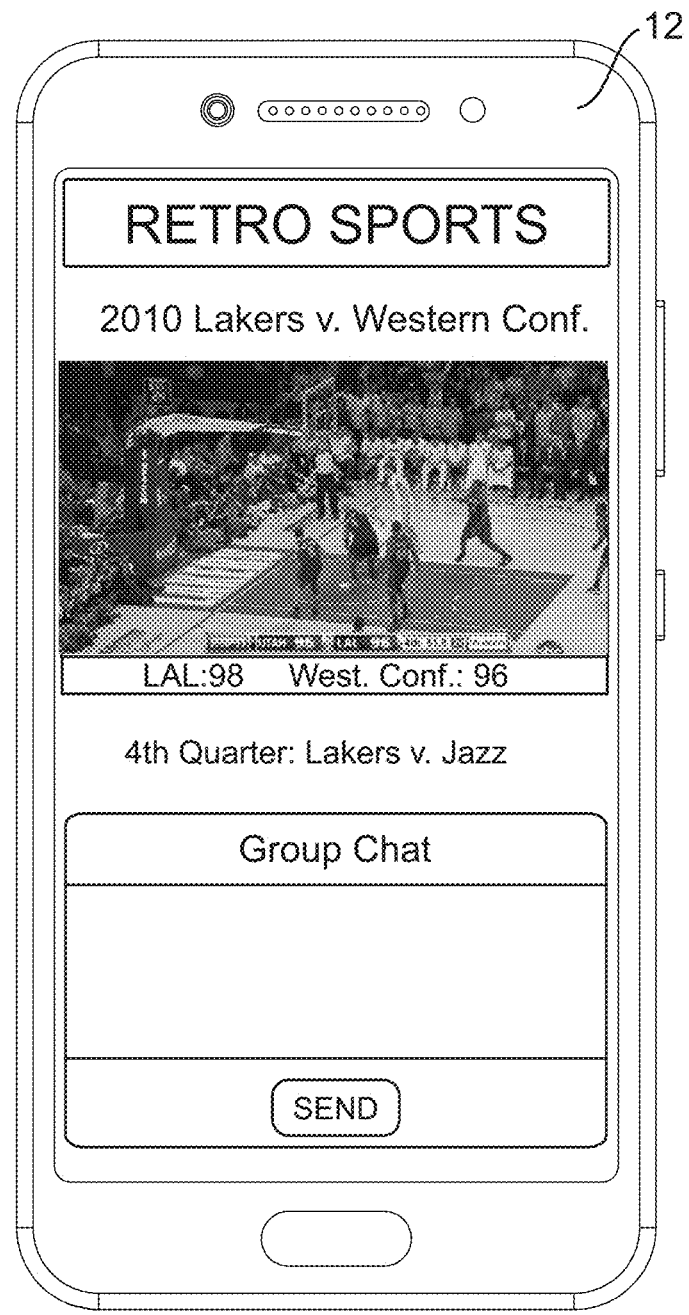
FIG. 5G is a user interface for interaction with a retro sports system according to an embodiment.

The user may then be directed to a streaming interface as shown in FIG. 5G. The streaming interface may include steaming the fourth quarter between the Lakers and Jazz, tracking the score as points are scored in the game, wherein the points scored by the teams now playing in the fourth quarter are added to the combined first, second, and third quarter points to provide the current score between the teams. There is also a chat function allowing those that have bet, or friends, or the like, using the system 10 and viewing the retro game between Lakers and Western Conference opponents, to chat and engage with each other. At the end of the game, the total score is different and unique from any other historical game ever played.

Figure 6:
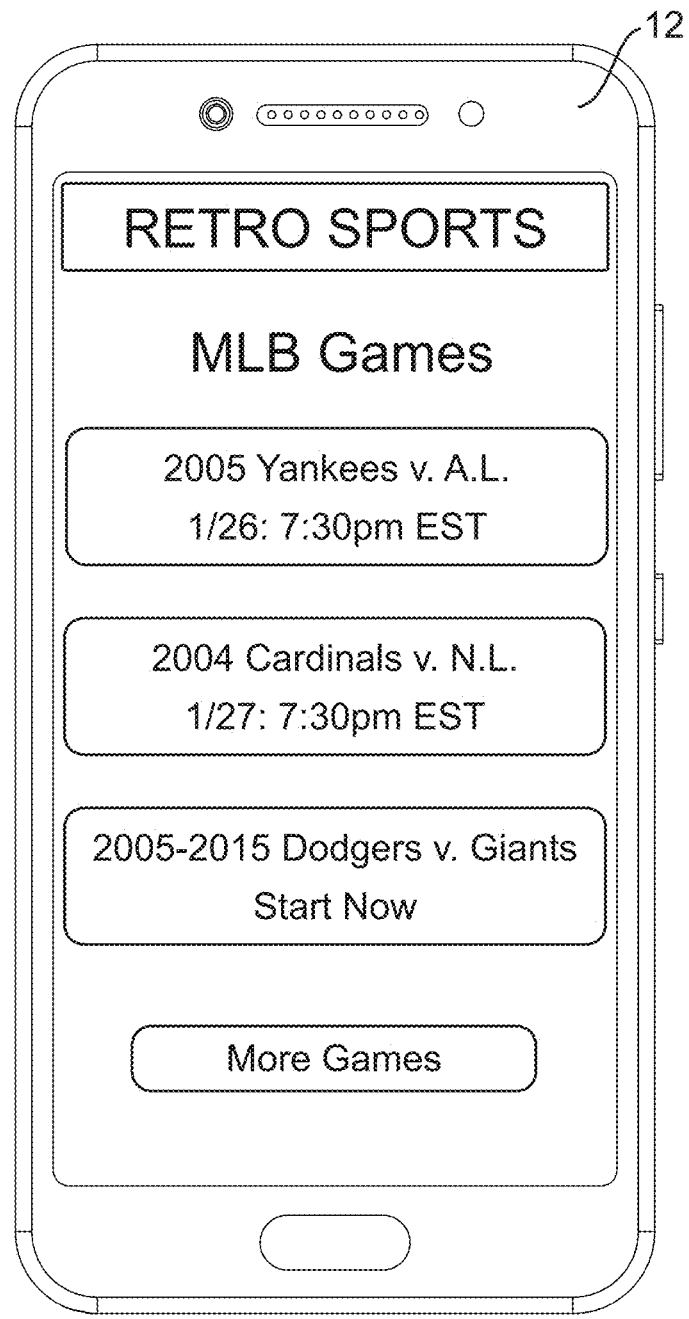
FIG. 6 is a user interface for interaction with a retro sports system according to an embodiment.
Figure 7:
FIG. 7 is a user interface for interaction with a retro sports system according to an embodiment.
Figure 8:
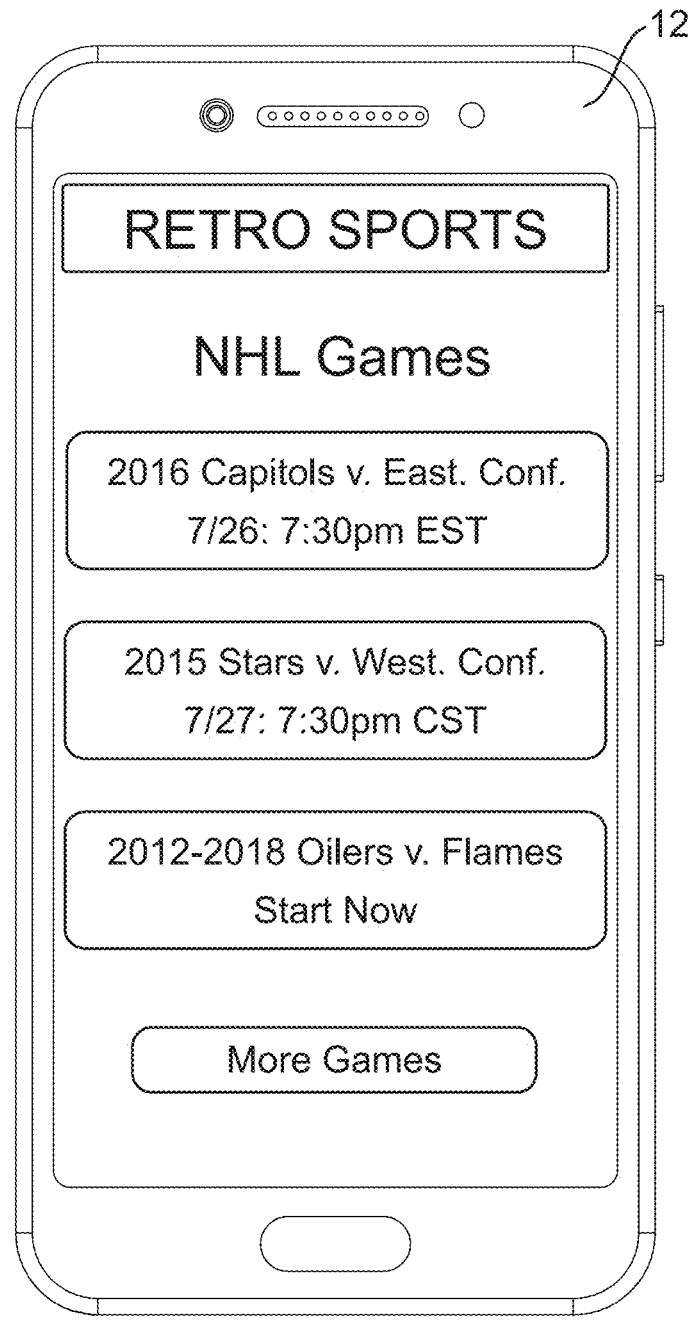
FIG. 8 is a user interface for interaction with a retro sports system according to an embodiment.

With regard to FIGS. 2-5G and 18, this is one example of how historical games can be utilized by the system 10 in order to create a unique sports game without knowing the end results. This unknown end result provided by the randomizer 15 selecting random increments of historical games is key to providing sporting events from past sporting events in a form that is new and allows for gaming or other sports related games. While FIGS. 2-5G show use of the system, it may also be used for other sporting events, such as baseball, as shown in FIG. 6, football, as shown in FIG. 7, hockey, as shown in FIG. 8, and so forth. With regard to baseball, as shown in FIG. 6, the increments may be each inning or may be a group of innings, such as 3-inning increments. With regard to football, as shown in FIG. 8, the increment may be quarters. With regard to hockey, as shown in FIG. 9, the increment may be periods. A realistic deployment of the system on a user computing device 12 is shown in FIG. 18. It will be understood that any type of increment may be utilized in operation of the system.

Figure 9A:
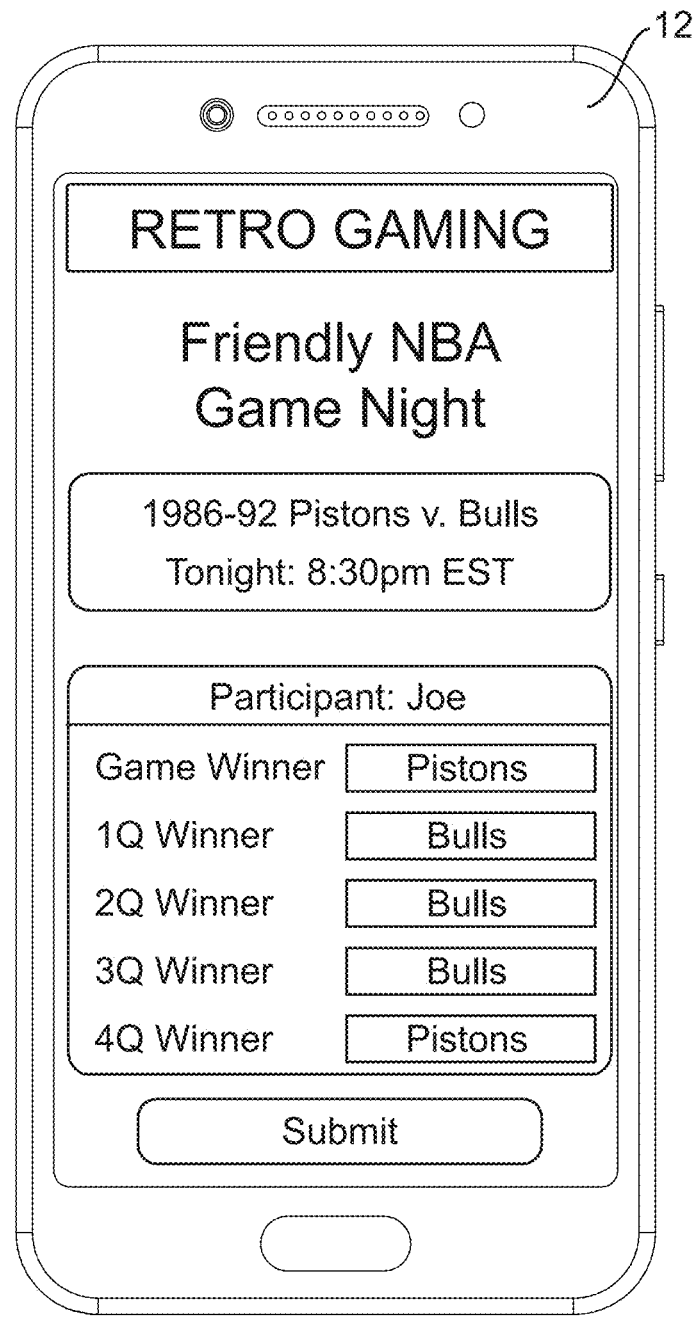
FIG. 9A is a user interface for interaction with a retro sports system according to an embodiment.
Figure 9B:
FIG. 9B is a user interface for interaction with a retro sports system according to an embodiment.
Figure 10:
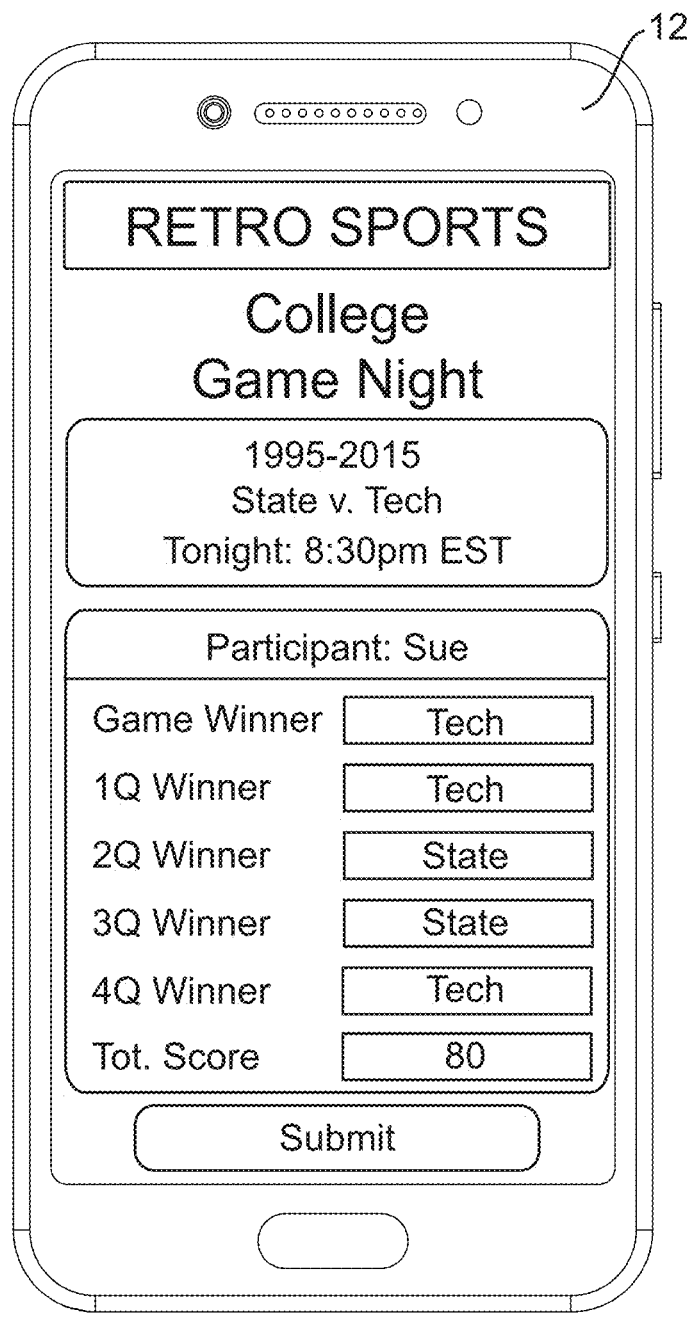
FIG. 10 is a user interface for interaction with a retro sports system according to an embodiment.

The system 10 may be used for other types of games, such as games that may be played in a friendly manner, including in bars, homes, and the like, as shown in FIGS. 9A-10 and 14-18. For example, there may be a game for the night, such as a rivalry game between the Pistons and the Bulls during the time period of 1986-92. Players may then participate in a game that allows for the selection of contest input, such as, without limitation, picking a winner of the overall game and the winner of each quarter, as shown in FIG. 9A. The system 10 operates as discussed above to randomly select quarters between the Pistons and Bulls during the time period selected. The system 10 may then track those with the correct selections and display them to the users in the form of a leaderboard or the like displayed on user computing device 12, as shown in FIG. 9B. FIGS. 9A-9B show the use in basketball, and FIG. 10 shows the use with college football. The game may include a tie breaker, such as the total points scored combined by the teams, as shown on the user computing device 12 in FIG. 10 wherein, if there is a tie, the user with the total score entered that is closest to the actual total score is the winner and then progresses down from there. Again, the system 10 may be used for games related to various sports and various types of games, without limitation, basketball, football, soccer, baseball, hockey, polo, golf, and so forth.

Further still, the users may use computing devices to select contest input, such as points by a certain basketball player, hits by a certain baseball player, goals scored by a player, saves by a goalkeeper, rushing yards by a running back and so forth. The contest input may include over under selections, selections based on odds generated by the system or the like.

The system 10 may operate in a business location that does not allow betting, but where prizes may still be obtained. For example, a sport bar may provide a virtual retro sports game, as depicted in an advertisement, such as those shown in FIGS. 16 and 19. Participants may then engage in game play using the system 10 as described above with reference to FIGS. 9A-10. The users may pay to enter the game and winners, or top scorers of a predetermined number, may win a prize, such as a cash prize, a gift cards, free food and/or drink, and so forth. The system 10 may display the results throughout the game on a TV or other display 20 (see FIG. 12) within the sports bar for all to see the standings of those participating. In these instances, the business may have a business computing device that is connected to the server 14, wherein the business includes a control interface that allows the business to select certain types of contest input, scoring and so forth.

Figure 15:
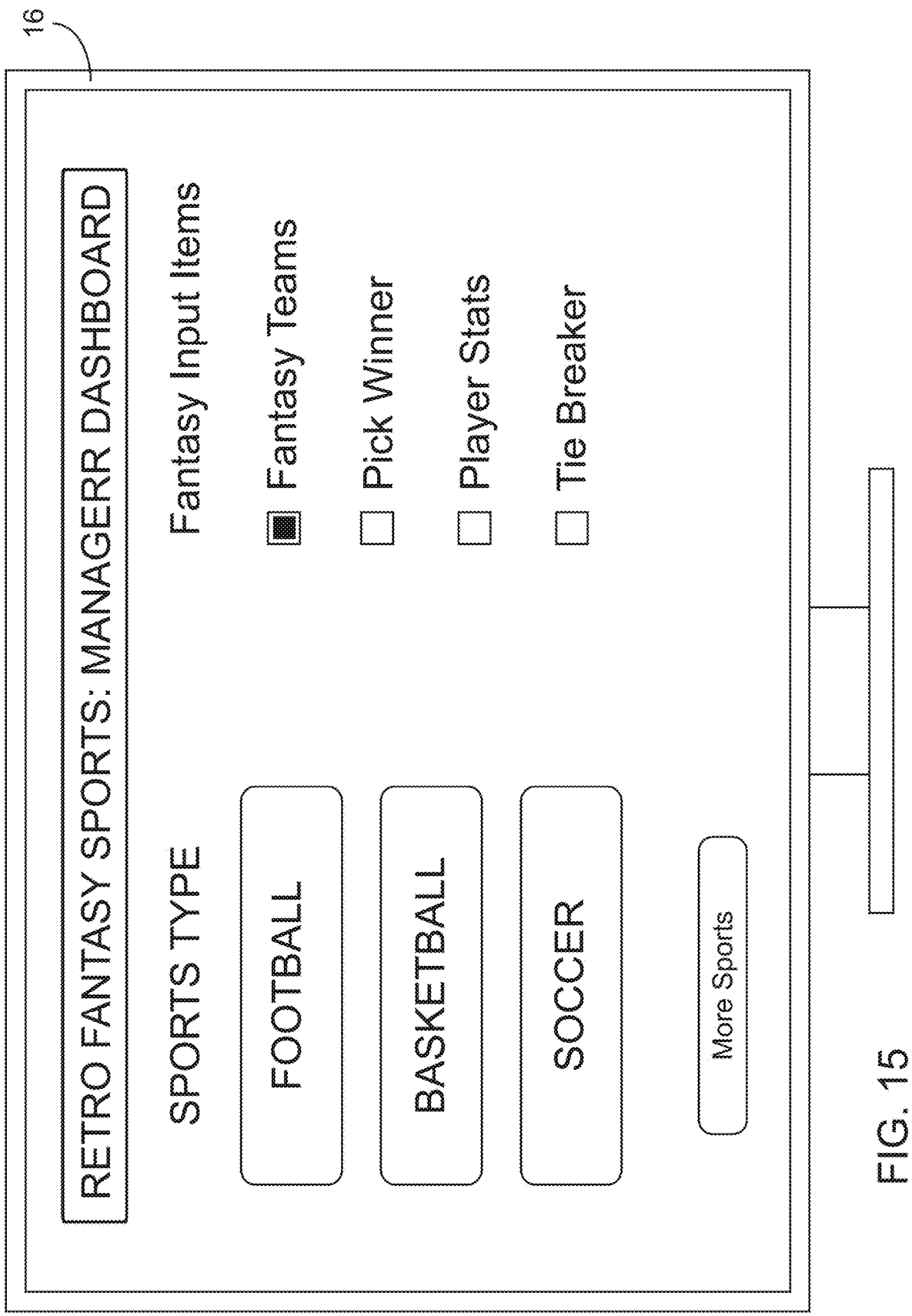
FIG. 15 depicts a manager computing device operating a user interface to access a retro sports system according to an embodiment.

Referring again to FIG. 1 and also to FIG. 15, the system 10 may include a manager computing device 16 that is coupled to the server 14. In these embodiments, a bar owner, league manager, club or team organizer or the like may operate the manager computing device 16. The server 14 may be programmed to received and process a signal that the manager computing device has accessed the system; send, for display on the plurality of user computing devices, historical sports games information, including available historical sports games for a predetermined historical time frame; receive a historical sports game request from the manager computing device and communicate with the randomizer 15 to randomly select multiple increments of historical games from the historical sports games information that match the historical sports game request, including the teams playing within the predetermined historical time frame, and create a new sports game from the selected increments of historical sports games from the historical sports games information stored on the server; receive and process a signal that the plurality of user computing devices have accessed the system and are searching for a sports game; send, for display on the plurality of user computing devices, the new sports game and contest input items for selection on the user computing devices; receive and process a signal from the plurality of user computing devices including selection of contest input items; stream the new sports game to the plurality of user computing devices; and determine whether the selected contest input items from each of the plurality of user computing devices are correct.

The manager computing device 16, as shown in FIG. 15 may include a user interface, such as, but not limited to, a manager dashboard. The manager user may then engage the system through the manager computing device 16 to select the type of sport for the use with a retro sports game, the teams, a time period, the contest inputs that will be available to participants using a user computing device 12 to access the system and participate in the retro sports game being provided by the manager computing device 16.

Figure 19A:
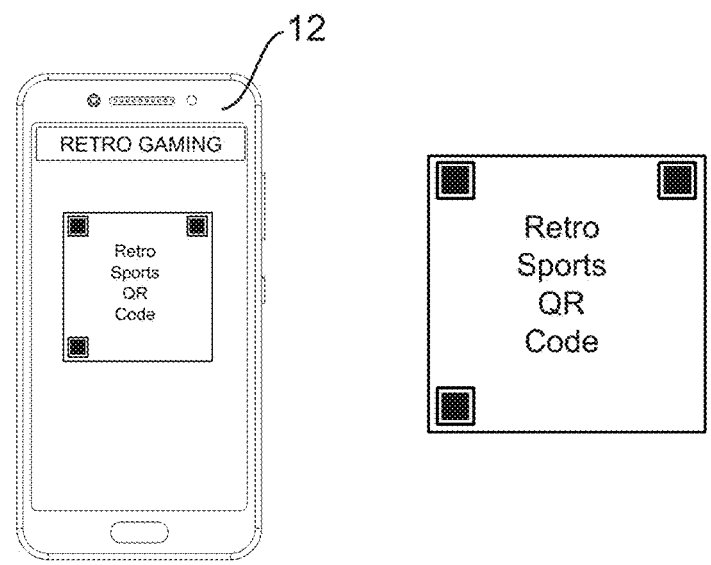
FIG. 19A is a front view of a user computing device scanning a code to access a particular retro sports game according to an embodiment.
Figure 19B:
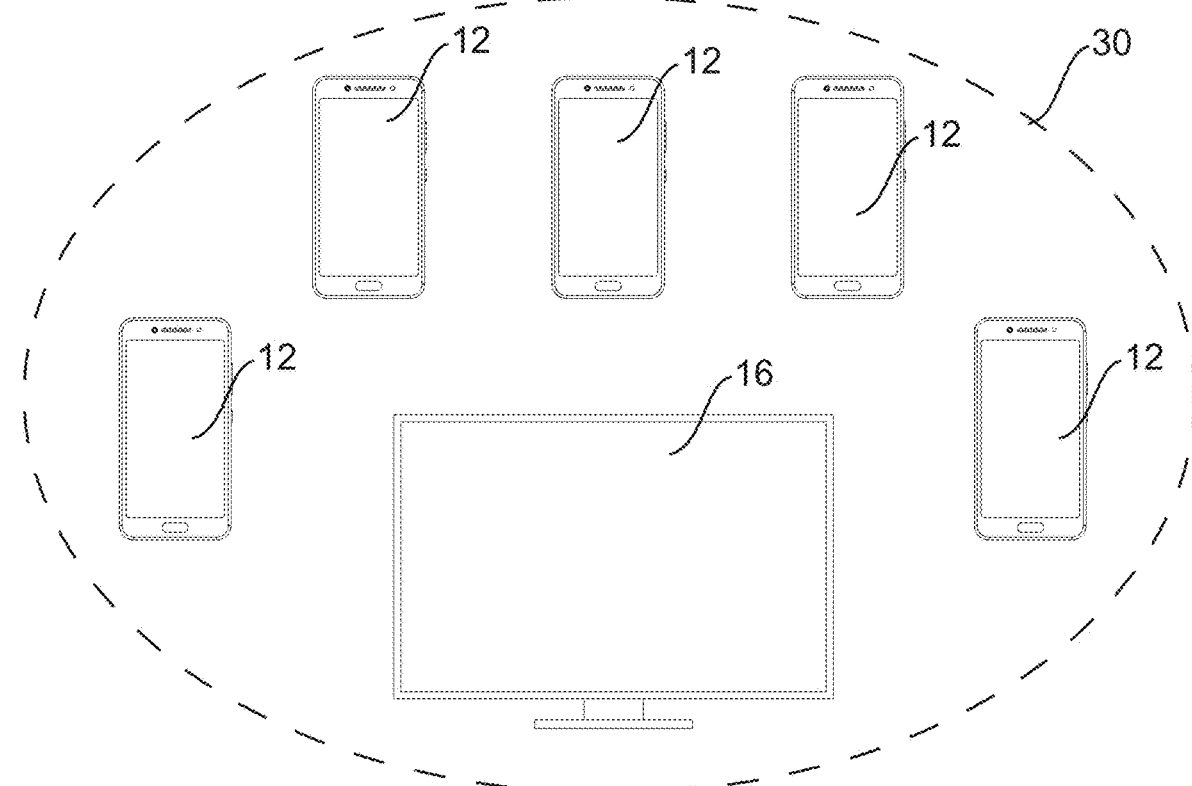
FIG. 19B is a view of plurality of user computing devices within a proximity zone of a manager computing device to access a particular retro sports game established by the manager computing device according to an embodiment.

In these embodiments, a plurality of user computing devices 12 may then participate in a retro sports game as established by the manager computing device 16. They may do so in various ways, as shown in FIGS. 2-14, by accessing the system 10 through a user computing device 12. A first example, FIGS. 2-14 show a user computing device 12 accessing the system 10 by use of the internet, a web app, or a mobile app, wherein the user computing device establishes a communication with the server. In this first example, a user may need to provide credentials associated with a retro sports game established by the manager computing device 16 to then participate in the game. A second example includes a business, home or the like providing a code, such as a QR code, as shown in FIG. 19A, that may be scanned by the user computing device 12 to gain access to and participate in the retro sports game established by the manager computing device 16. A third example, as shown in FIG. 19B, of accessing the system 10 to join the retro sports game established by the manager computing device may include the use of a certain proximity zone 30 around the manager computing device 16. In these embodiments, the manager computing device 16 may receive programming from the server 14 to establish a proximity zone 30 of a predetermined size. As user computing device 12 enters the proximity zone 30 and access an app or the like, the user computing devices 12 may establish a connection with the server 14 and access and participate in the retro sports game established by the manager computing device 16. There various other ways of accessing the system 10 and participating in the game established by manager computing device 16. These may include, for example and without limitation, an invite/referral from the manager computing device 16 or another user computing device 12, a stationary gaming device at a location, a dedicated device, such as a tablet or the like at a location, and auto-share from one user computing device 12 to another.

Figure 11A:
FIG. 11A is a user interface for interaction with a retro sports system according to an embodiment.
Figure 11B:
FIG. 11B is a user interface for interaction with a retro sports system according to an embodiment.

The system 10 may also be utilized in fantasy sports. FIGS. 11A-11B depict only one way that such a fantasy sports league could operate, but many other iterations are possible utilizing the system 10. As shown in FIGS. 11A-11B, a fantasy football system may be established. For example, the system 10 may allow individuals to select a certain number of teams for a certain year period and choose a certain number of teams that the individuals think will win. For example, the fantasy league can have the user select 16 teams they think will win against randomly selected quarters from the team versus the team's conference during that year season. This is just one example of many fantasy leagues that can be formed.

Figure 16:
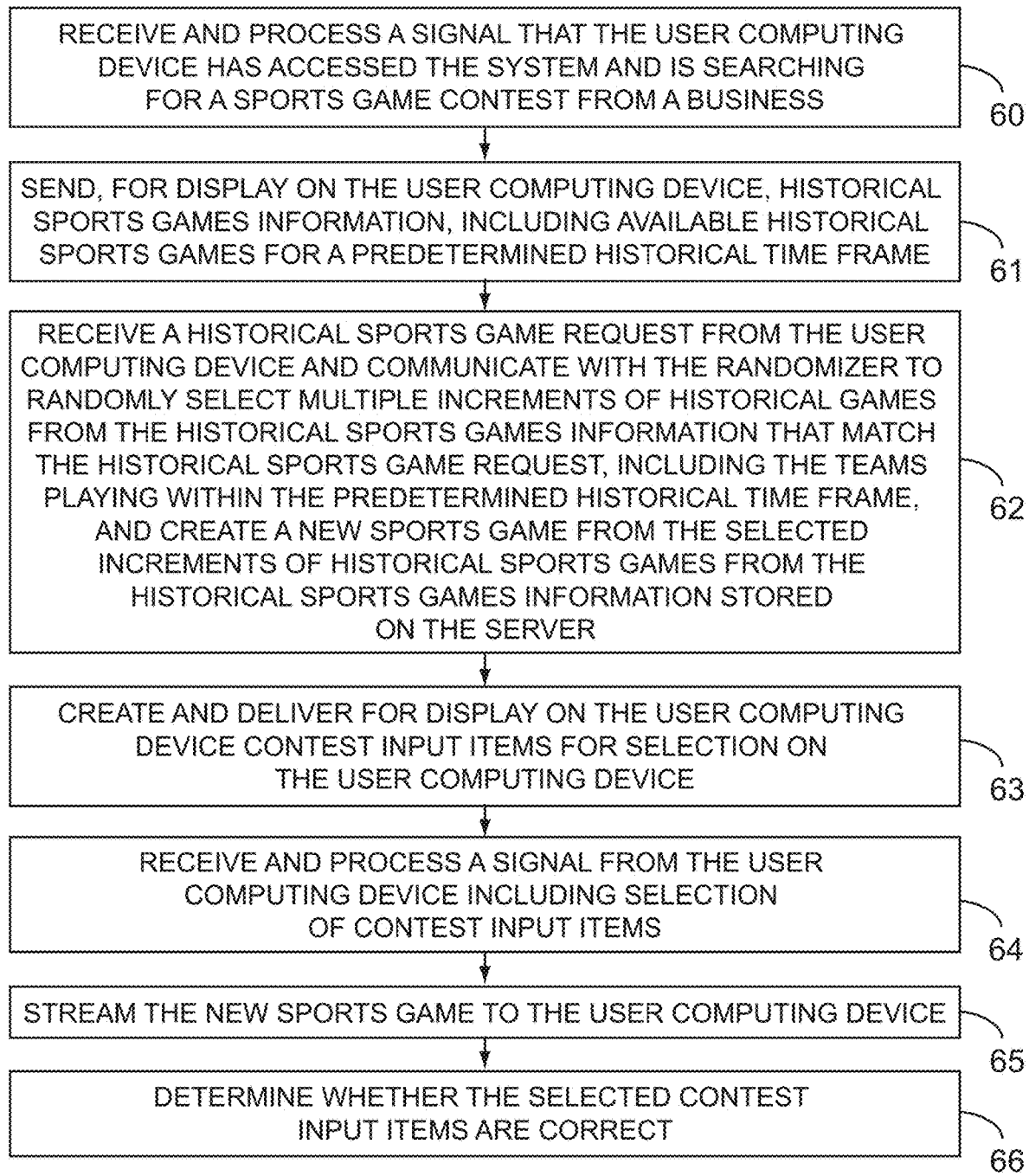
FIG. 16 depicts method of operation a retro sports system according to an embodiment.

The system 10 may also be utilized in fantasy sports. FIGS. 1 and 11-13, 16 and 17 depict ways that such a fantasy sports league could operate, but many other iterations are possible utilizing the system 10. Further, elements from the betting retro sports system may be utilize in the fantasy retro sports system. In one embodiment, the system 10 may include a server 14 having a memory storing historical sports games information, including video of historical games partitioned into system-selected increments; a randomizer 15 coupled to the server; and a plurality of user computing devices 12 coupled to the server 14. As shown in FIG. 16, the server 14 may be programmed to receive and process a signal that the user computing device has accessed the system and is searching for a sports game contest from a business (Step 60); send, for display on the user computing device, historical sports games information, including available historical sports games for a predetermined historical time frame (Step 61); receive a historical sports game request from the user computing device and communicate with the randomizer to randomly select multiple increments of historical games from the historical sports games information that match the historical sports game request, including the teams playing within the predetermined historical time frame, and create a new sports game from the selected increments of historical sports games from the historical sports games information stored on the server (Step 62); create and deliver for display on the user computing device contest input items for selection on the user computing device (Step 63); receive and process a signal from the user computing device including selection of contest input items (Step 64); stream the new sports game to the user computing device (Step 65); and determine whether the selected contest input items are correct (Step 66).

In embodiments, the server is further programmed to send instruction to the user computing device to stop playing the new sports game after each of the selected increments of the new sports game; create and deliver for display on the user computing device additional contest input items for selection on the user computing device after each of the selected increments of the new sports game, except for the last selected increment; stream the next selected increments of the new sports game to the user computing device or to the other device designated by the user computing device; determine whether the selected additional contest input items are correct; and send the user computing device a reward associated with the business in response to a predetermined number of correct contest input items. Further still, the server may be further programmed to send the user computing device a reward associated with the business in response to a correct contest input item.

Figure 17:
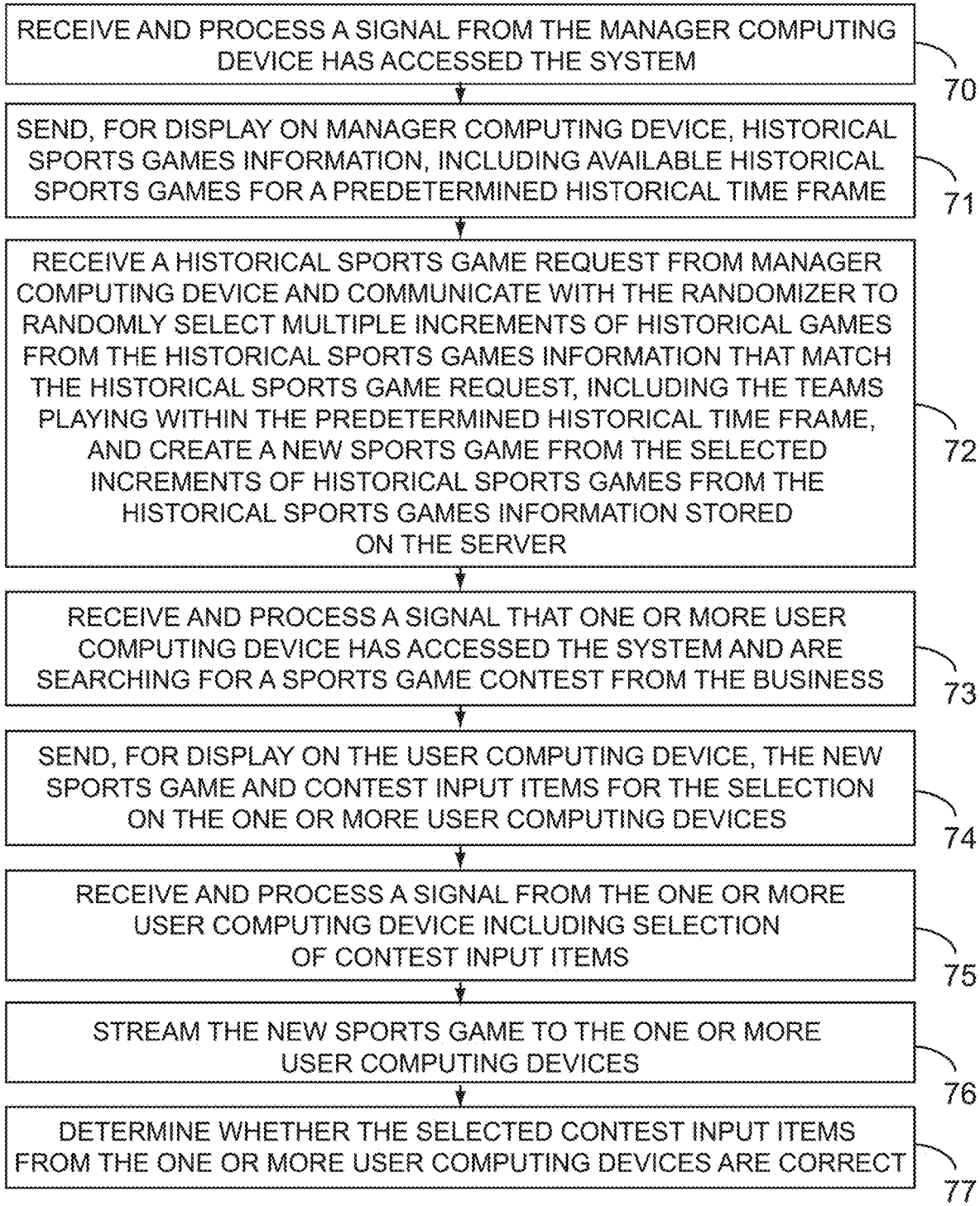
FIG. 17 depicts method of operation a retro sports system according to an embodiment.

In another embodiment, as depicts in FIG. 17, the retro fantasy sports system 10 may include a server 14 having a memory storing historical sports games information, including video of historical games partitioned into system-selected increments; a randomizer 15 coupled to the server 14; a manager computing device 16 coupled to the server 14; and a plurality of user computing devices 12 coupled to the server 14. The server 14 may be programmed to received and process a signal that the manager computing device has accessed the system (Step 70); send, for display on the plurality of user computing devices, historical sports games information, including available historical sports games for a predetermined historical time frame (Step 71); receive a historical sports game request from the manager computing device and communicate with the randomizer to randomly select multiple increments of historical games from the historical sports games information that match the historical sports game request, including the teams playing within the predetermined historical time frame, and create a new sports game from the selected increments of historical sports games from the historical sports games information stored on the server (Step 72); receive and process a signal that the plurality of user computing devices have accessed the system and are searching for a sports game (Step 73); send, for display on the plurality of user computing devices, the new sports game and contest input items for selection on the user computing devices (Step 74); receive and process a signal from the plurality of user computing devices including selection of contest input items (Step 75); stream the new sports game to the plurality of user computing devices (Step 76); and determine whether the selected contest input items from each of the plurality of user computing devices are correct (Step 77).

The server 14 as depicted in FIG. 17 may also be programmed to perform the same or similar steps as discussed above with regard to FIG. 16. The various sports types and retro fantasy input items may be the same also.

The system 10 may also operate for other competitive games that may be focused on particular player performance from historical games. As an example, the system that allows the user to select a player, such as a baseball pitcher. In such an example, the system 10 may operate to allow a user to select a number of innings that pitcher may pitch a scoreless inning, during a selected period of time, such as the last 5 years. The system 10 may select random innings pitched by that pitcher to determine if the pitcher pitched a scoreless inning. Each inning pitched may be streamed. In some embodiments, the system 10 may be programmed to offer additional incentives to add to the original bid on the number of scoreless innings and allow a user to continue in the bidding/betting. While this embodiment shows the betting or bidding on a baseball pitcher, similar or other games may be utilized for other players and sports.

Figure 12:
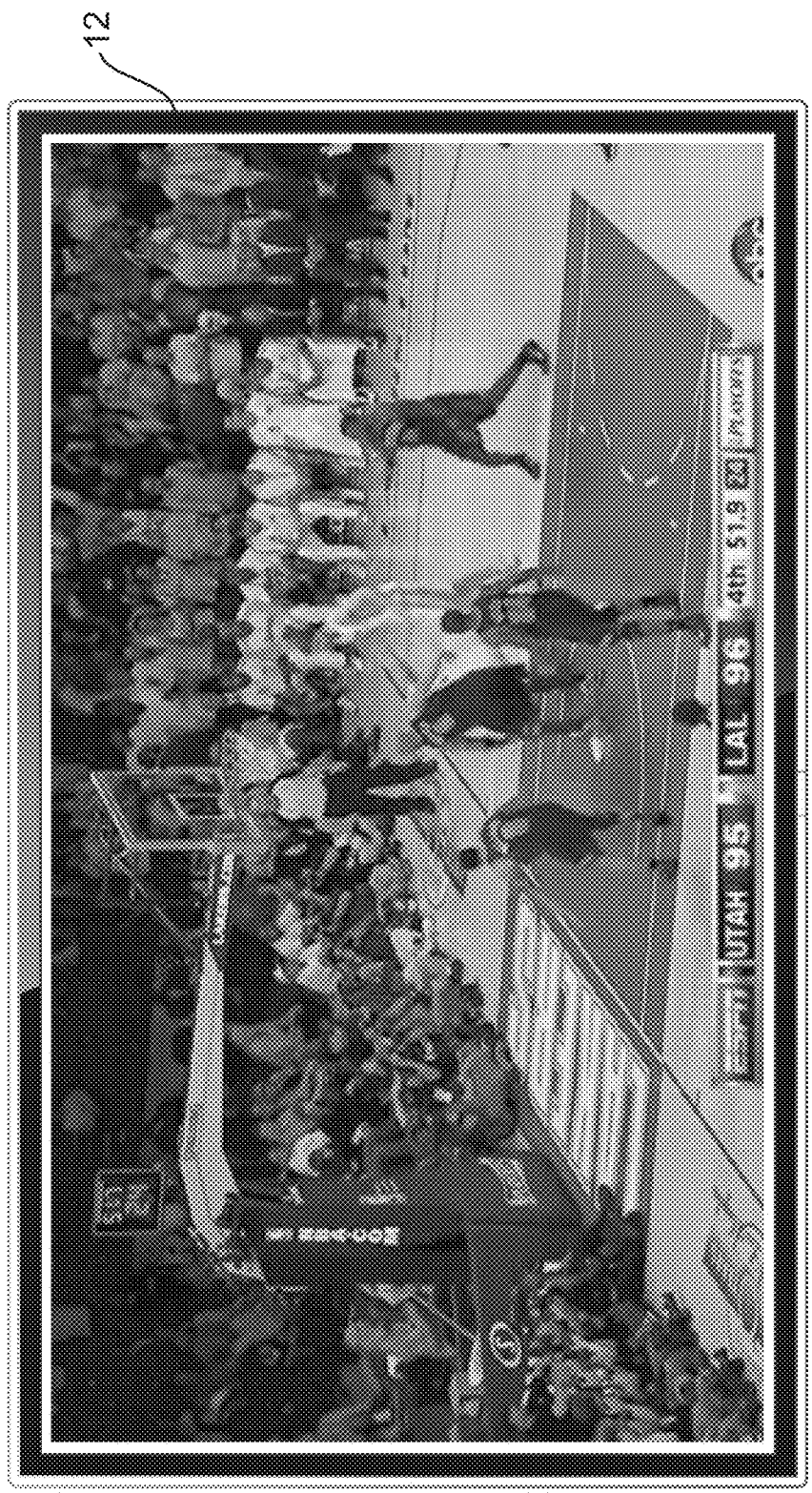
FIG. 12 is a television utilized as a component of a retro sports system according to an embodiment.
Figure 13:
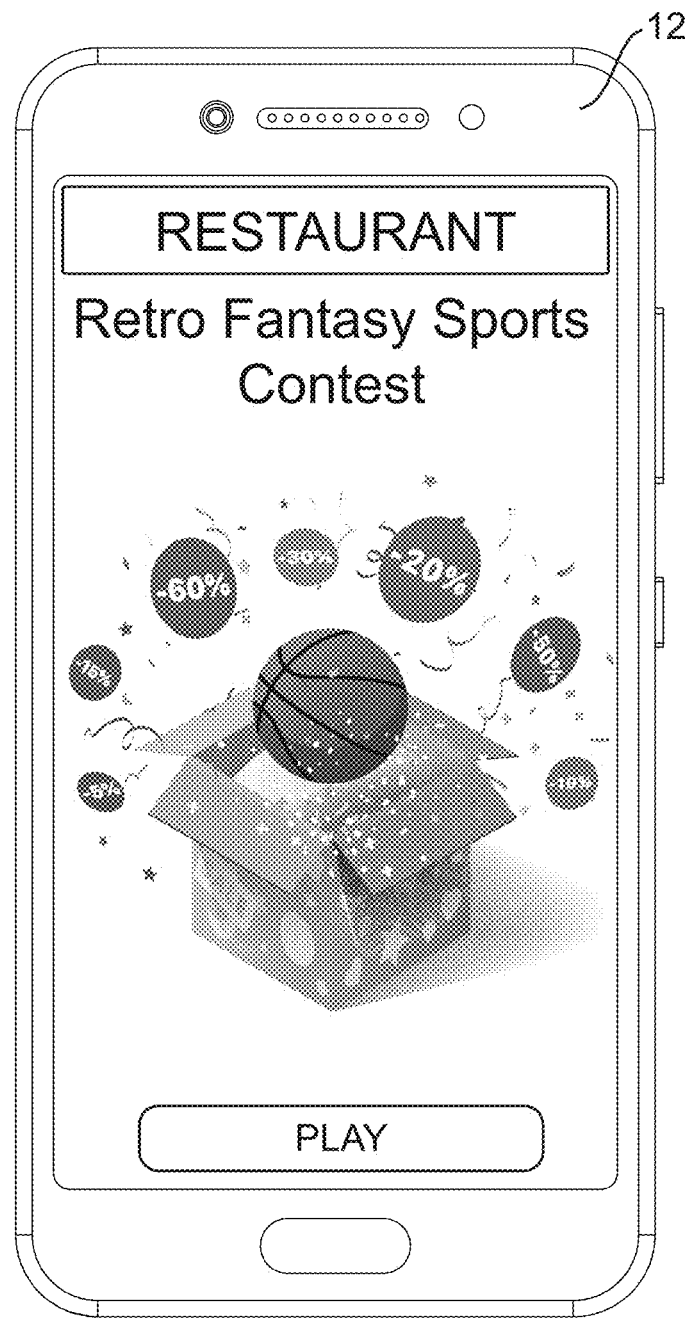
FIG. 13 depicts a user computing device access use of a retro sports system that business is using to publicize/market to customers and potential customers according to an embodiment.
Figure 14:
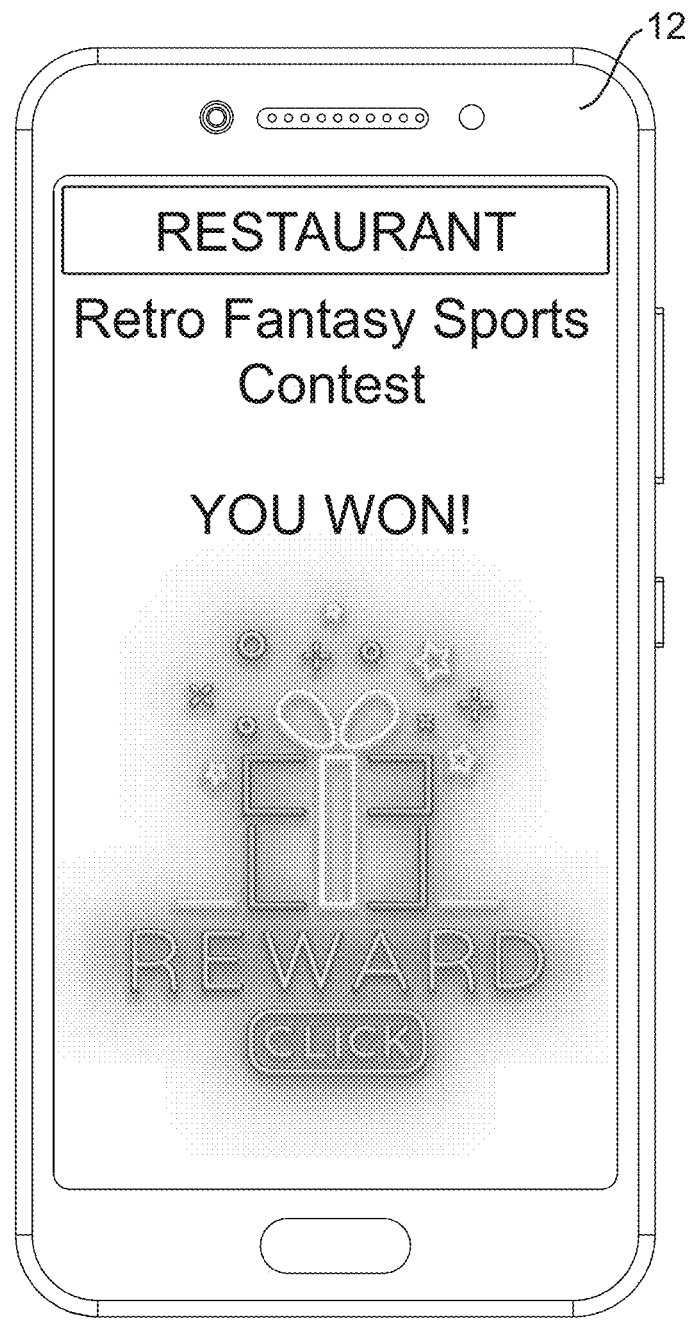
FIG. 14 depicts a user computing device operating a retro sports system and winning a retro sports contest established by a business according to an embodiment.

In additional embodiments, the system 10 may be used to produce a custom game, such as selecting a favorite team to display a game with random quarters for a particular individual, or even randomly selecting from the best quarters of a favorite player and streaming the new game with random increments selected by the server. In embodiments, the system may stream the game on a display 20, such as a TV, as shown in FIG. 12, and allow those participating or in the room to watch the game as shown in FIG. 13.

Other embodiments may include differing types of games. For example, different games of differing lengths may be selected, such as, but not limited to, a marathon baseball game of 100 innings or the like.

The system, in operation, provides many benefits that are not previously provided by existing systems. For example, and without limitation, the benefits may include:

a. Provides fun and unpredictability to past sports events
b. Provides entertainment opportunity (need to stay on for last unit of a certain game to know outcome) that simulates a full game
c. Provides a wagering opportunity
d. Provides a friendly competition opportunity
e. Provides entertainment and excitement when sports are not available live (like during a pandemic) or when your favorite sport is not in season
f. Provides a social platform for connecting with friends through retro games
g. Provides a competitive opportunity to pick games in a league or fantasy pool
h. System has integrity through random selection of sports periods
i. System allows odds making, since historical periods for teams can be calculated against periods of selected opponents for aggregate data (example: Lakers beat their rival clippers 18 out of 24 quarters in 2018) and then point differential can also come into play
j. System can be custom streamed because of new technology
k. System can provide game start times for larger group play or betting handle/purse
l. System can work for a variety of sports by breaking up increments of play and scoring Embodiments may be available on or through the internet, such as through domain names reserved and owned by Applicant that include familysports.club, clipstobet.com, sportsrandomizer.com, filmtowin.com, rivalfootage.com, randomrivals.com, familyrivals.com, therivalmachine.com, rewritesports.com, samegamenewscore.com, retro-sportsbook.com, betinthepast.com, gameofchance.app, fantasyrestrosports.com and the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A retro sports system comprising:
a server having a memory storing historical sports games information, including video of historical sports games partitioned into system selected increments, wherein the video of historical games comprise actual past sports games;
a randomizer coupled to the server; and
a user computing device coupled to the server, wherein the server is programmed to:
receive and process a signal that the user computing device has accessed the system and is searching for a sports game contest from a business;
send, for display on the user computing device, the historical sports games information, including the historical sports games that are available for a predetermined historical time frame;
receive a historical sports game request from the user computing device and communicate with the randomizer to randomly select multiple of the selected increments of the historical sports games from the historical sports games information that match the historical sports game request, including actual past teams playing within the predetermined historical time frame, and create a new sports game from the selected increments of the historical sports games from the historical sports games information stored on the server;
create and deliver for display on the user computing device contest input items for selection on the user computing device;
receive and process a signal from the user computing device including selection of the contest input items;
stream each of the selected increments of the new sports game to the user computing device;
stream a score of the new sports game during each selected increment, wherein the score of the teams from the previous increment is automatically updated as scoring occurs and displayed on the user computing device to display the score of the new sports game; and
determine whether the selected contest input items are correct.

2. The system of claim 1, wherein the server is further programmed to send instruction to the user computing device to stop playing the new sports game after each of the selected increments of the new sports game.

3. The system of claim 2, wherein the server is further programmed to additionally create and deliver for display on the user computing device the contest input items for selection on the user computing device after each of the selected increments of the new sports game, except for the t selected increment selected last.

4. The system of claim 3, wherein the server is further programmed to stream the selected increments selected next of the new sports game to the user computing device or to a non-user computing device designated by the user computing device.

5. The system of claim 4, wherein the server is further programmed to determine whether the contest input items additionally selected are correct.

6. The system of claim 5, wherein the server is further programmed to send the user computing device a reward associated with the business in response to a predetermined number of the contest input items that are correct.

7. The system of claim 1, wherein the server is further programmed to send the user computing device a reward associated with the business in response to the contest input item being correct.

8. A retro sports system comprising:
a server having a memory storing historical sports games information, including video of historical sports games partitioned into system selected increments, wherein the video of historical games comprise actual past sports games;
a randomizer coupled to the server;
a manager computing device located at a business, the manager computing device coupled to the server; and
one or more user computing devices coupled to the server, wherein the server is programmed to:
received and process a signal that the manager computing device has accessed the system;
send, for display on the manager computing device, the historical sports games information, including the historical sports games that are available for a predetermined historical time frame;
receive a historical sports game request from the manager computing device and communicate with the randomizer to randomly select multiple of the selected increments of the historical sports games from the historical sports games information that match the historical sports game request, including actual past teams playing within the predetermined historical time frame, and create a new sports game from the selected increments of historical sports games from the historical sports games information stored on the server;
receive and process a signal that the one or more user computing devices have accessed the system and are searching for a sports game contest from the business;
send, for display on the one or more user computing devices, the new sports game and contest input items for selection on the one or more user computing devices;
receive and process a signal from the one or more user computing devices including selection of the contest input items;
stream each of the selected increments of the new sports game to the one or more user computing devices;
stream a score of the new sports game during each selected increment, wherein the score of the teams from the previous increment is automatically updated as scoring occurs and displayed on the one or more user computing devices to display the score of the new sports game; and
determine whether the selected contest input items from the one or more user computing devices are correct.

9. The system of claim 8, wherein the server is further programmed to send instruction to the one or more user computing devices to stop playing the new sports game after each of the selected increments of the new sports game.

10. The system of claim 9, wherein the server is further programmed to additionally create and deliver for display on the one or more user computing devices the contest input items for selection on the one or more user computing devices after each of the selected increments of the new sports game, except for the selected increment selected last.

11. The system of claim 10, wherein the server is further programmed to stream the selected increments selected next of the new sports game to the one or more user computing devices.

12. The system of claim 11, wherein the server is further programmed to determine whether the contest input items additionally selected from each of the one or more user computing devices are correct.

13. The system of claim 12, wherein the server is further programmed to send the one or more user computing devices a reward associated with the business in response to a predetermined number of the contest input items that are correct.

14. The system of claim 8, wherein the server is further programmed to send the one or more user computing devices a reward associated with the business in response to the contest input item being correct.

* * * * *

UNITED STATES PATENT AND TRADEMARK OFFICE
CERTIFICATE OF CORRECTION

| | |
|---|---|
| PATENT NO. | : 11,651,648 B2 |
| APPLICATION NO. | : 17/202561 |
| DATED | : May 16, 2023 |
| INVENTOR(S) | : Charles Isgar |

It is certified that error appears in the above-identified patent and that said Letters Patent is hereby corrected as shown below:

In the Claims

Column 15, Line 57 In Claim 3, the final line, the standalone letter "t" should be deleted Signed and Sealed this
Twenty-seventh Day of June, 2023

Katherine Kelly Vidal
*Director of the United States Patent and Trademark Office*